United States Patent
Frinken et al.

(10) Patent No.: US 10,873,462 B1
(45) Date of Patent: Dec. 22, 2020

(54) VERIFICATION OF COMPUTATION BY UNTRUSTED SOURCE

(71) Applicant: Onu Technology, Inc., San Jose, CA (US)

(72) Inventors: Volkmar Frinken, San Jose, CA (US); Guha Jayachandran, San Jose, CA (US)

( * ) Notice: Subject to any disclaimer, the term of this patent is extended or adjusted under 35 U.S.C. 154(b) by 150 days.

(21) Appl. No.: 16/014,733

(22) Filed: Jun. 21, 2018

(51) Int. Cl.
*H04L 29/00* (2006.01)
*H04L 9/32* (2006.01)
*G06F 16/901* (2019.01)

(52) U.S. Cl.
CPC ........ *H04L 9/3236* (2013.01); *G06F 16/9014* (2019.01); *G06F 16/9027* (2019.01); *H04L 9/321* (2013.01)

(58) Field of Classification Search
CPC ............. G06F 16/9014; G06F 16/9027; H04L 9/3236; H04L 9/321
See application file for complete search history.

(56) References Cited

U.S. PATENT DOCUMENTS

| | | | | |
|---|---|---|---|---|
| 7,873,868 B1* | 1/2011 | Heideman | ............... | G06F 9/466 711/113 |
| 8,825,646 B1* | 9/2014 | Alpert | ..................... | H04L 67/02 707/737 |
| 10,389,518 B2* | 8/2019 | Chen | ..................... | H04L 9/3236 |
| 2003/0031319 A1* | 2/2003 | Abe | ................. | G11B 20/00086 380/232 |
| 2007/0064932 A1* | 3/2007 | Struik | ..................... | G06F 7/725 380/30 |
| 2012/0030468 A1* | 2/2012 | Papamanthou | ....... | H04L 9/3026 713/171 |
| 2014/0245020 A1* | 8/2014 | Buldas | .................. | H04L 9/3242 713/177 |
| 2017/0078101 A1* | 3/2017 | Maximov | ............. | H04L 9/3242 |
| 2017/0093579 A1* | 3/2017 | Maximov | ............... | H04L 9/006 |
| 2017/0323392 A1* | 11/2017 | Kasper | ................... | G06Q 40/12 |
| 2018/0078843 A1* | 3/2018 | Tran | ........................ | G16H 40/63 |
| 2018/0117447 A1* | 5/2018 | Tran | ....................... | B33Y 10/00 |
| 2018/0139057 A1* | 5/2018 | Truu | ..................... | H04L 9/3236 |
| 2018/0219669 A1* | 8/2018 | Chen | ....................... | H04L 9/002 |
| 2019/0312734 A1* | 10/2019 | Wentz | ..................... | H04L 9/006 |

FOREIGN PATENT DOCUMENTS

KR 20170104598 A * 9/2017 ............ H01M 8/026

* cited by examiner

*Primary Examiner* — Don G Zhao
(74) *Attorney, Agent, or Firm* — Robinson IP Law, PLLC

(57) ABSTRACT

A method of performing a computation by an untrusted entity includes: storing a state of the computation at a plurality of points of the computation; generating a plurality of hashes based on the state of the computation at points of the computation; generating a hash tree including a plurality of leaf nodes corresponding to the plurality of hashes of states of the computation and further wherein internal tree nodes are derived as the hash of at least two child nodes; creating at least one pair of paths from a root of the hash tree to the leaf nodes corresponding to the plurality of hashes of states of the computation, selecting the point in the computation corresponding to the leaf node of a created path, along with a succeeding point in the computation; and transmitting a proof of the computation comprising the at one path of the hash tree and siblings of the path to one or more third party entities for verification.

9 Claims, 4 Drawing Sheets

| Memory state | $S_0$ | $S_1$ | $S_2$ | $S_3$ | ... |
|---|---|---|---|---|---|
| Position in program | $P_0$ | $P_1$ | $P_2$ | $P_3$ | ... |
| Time | $t_0$ | $t_1$ | $t_2$ | $t_3$ | ... |

| Hash | $h_0$ | $h_1$ | $h_2$ | ... |
|---|---|---|---|---|
| State | $s_0$ | $s_1$ | $s_2$ | ... |
| Position in program | $P_0$ | $P_1$ | $P_2$ | ... |
| Time | $t_0$ | $t_1$ | $t_2$ | ... |

VERIFICATION OF COMPUTATION BY UNTRUSTED SOURCE

FIELD

This disclosure relates to the field of cryptocurrency and distributed computing frameworks. More particularly, this disclosure relates to a method of verifying a computation performed by a worker in a worker-client relationship.

BACKGROUND

If a computation to be performed is assigned to some untrusted machine, a method is needed to verify whether that computation was faithfully performed by the untrusted machine. The verification should be performed without repeating the computation, but by looking at outputs of the computation and performing a minimal amount of computation.

There are a variety of verification strategies possible for computational work, including probabilistic verification, verification by repetition, and mathematically exact verification among them.

Verification can be performed by the requester of the work. This scenario is only possible if verification is sufficiently computationally simple for a requester to perform it on its own and thereby eliminates the "agent problem." Fortunately, this is true in many computations. If the requester trusts another party, it can offload verification.

Existing verification methods may require significant overhead and require continuous communication with a worker performing a computation. For example, TrueBit requires that challengers repeat a computation to locate a branch within the computation corresponding to the first of potentially many offending computational step. To incentivize external parties to verify a computation, a sophisticated system is required that may required additional overhead of 500-5,000%. The party performing the original computation must remain online to respond to queries for information regarding intermediate states of the computation.

What is needed, therefore, is a new method of verifying a computation by an untrusted source that enables any party to verify the computation non-interactively significantly reducing computing overhead.

SUMMARY

The above and other needs are met by a method of verifying a computation performed by an untrusted entity. In a first aspect, a method of performing a computation by an untrusted entity includes: storing the state of the computation at one or more points along a length of the computation; generating one or more hashes based on the state of the computation at the one or more of points along the length of the computation; generating a hash tree including one or more leaf nodes, wherein leaf nodes of the hash tree correspond to the one or more hashes of states of the computation and further wherein internal tree nodes are derived as the hash of at least two child nodes; creating at least one path from the root of the hash tree to a leaf node corresponding to the one or more of hashes of states of the computation; selecting the point in the computation corresponding to the leaf node of a created path, along with a succeeding point in the computation; and transmitting a proof of the computation comprising the at least one path of the hash tree and siblings of each leaf destination of the path to one or more other entities for verification.

In one embodiment, the state of the computation is stored at 32 or more points along the length of the computation. In another embodiment, the state of the computation is stored on memory of the untrusted entity. In yet another embodiment, when the memory or disk of the untrusted entity is full, a partial proof of the computation is published.

In one embodiment, a plurality of partial proofs are published for verification by a third party. In another embodiment, when the partial proof is transmitted, all but one state of the computation are deleted from the memory of the untrusted entity.

In yet another embodiment, the method further includes verifying the performed computation by performing the steps of: receiving the transmitted proof of the computation including the at least one pair of paths of the hash tree and siblings of each leaf destination of the pair of paths; and verifying that a hash of each leaf destination is a hash of a pair of children of the leaf.

In a second aspect, a method of verifying a computation by an untrusted entity includes: on an untrusted device storing a state of the computation at one or more points along a length of the computation, generating one or more hashes based on the state of the computation at one or more of points along the length of the computation, generating a hash tree including one or more leaf nodes, wherein leaf nodes of the hash tree correspond to one or more hashes of states of the computation and further wherein internal tree nodes are derived as the hash of at least two child nodes, creating at least one pair of paths from a root of the hash tree to the leaf nodes corresponding to the one or more of hashes of states of the computation, the selecting the point in the computation corresponding to the leaf node of a created path, along with a succeeding point in the computation, and transmitting a proof of the computation comprising the at least one path of the hash tree and siblings of each leaf destination of the path to one or more other entities for verification; on a third party device receiving the transmitted proof of the computation including the at least one pair of paths of the hash tree and siblings of each leaf destination of the pair of paths and verifying that a hash of each leaf destination is a hash of a pair of children of the leaf.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Embodiments of the present disclosure relate generally to blockchain and related technologies. More specifically, embodiments of the present disclosure include methods for verifying a computation performed by an untrusted source without requiring the computation to be repeated. Methods include computing a hash tree corresponding to various states of a computation and verifying the computation using the hash tree. Advantages of methods of the present disclosure include the ability for any party to verify a computation performed by a worker without requiring additional communication with the worker. Further, any nodes within the hash tree may be verified without requiring additional communication with the worker and by only referring to the original hash tree.

Figure 1:
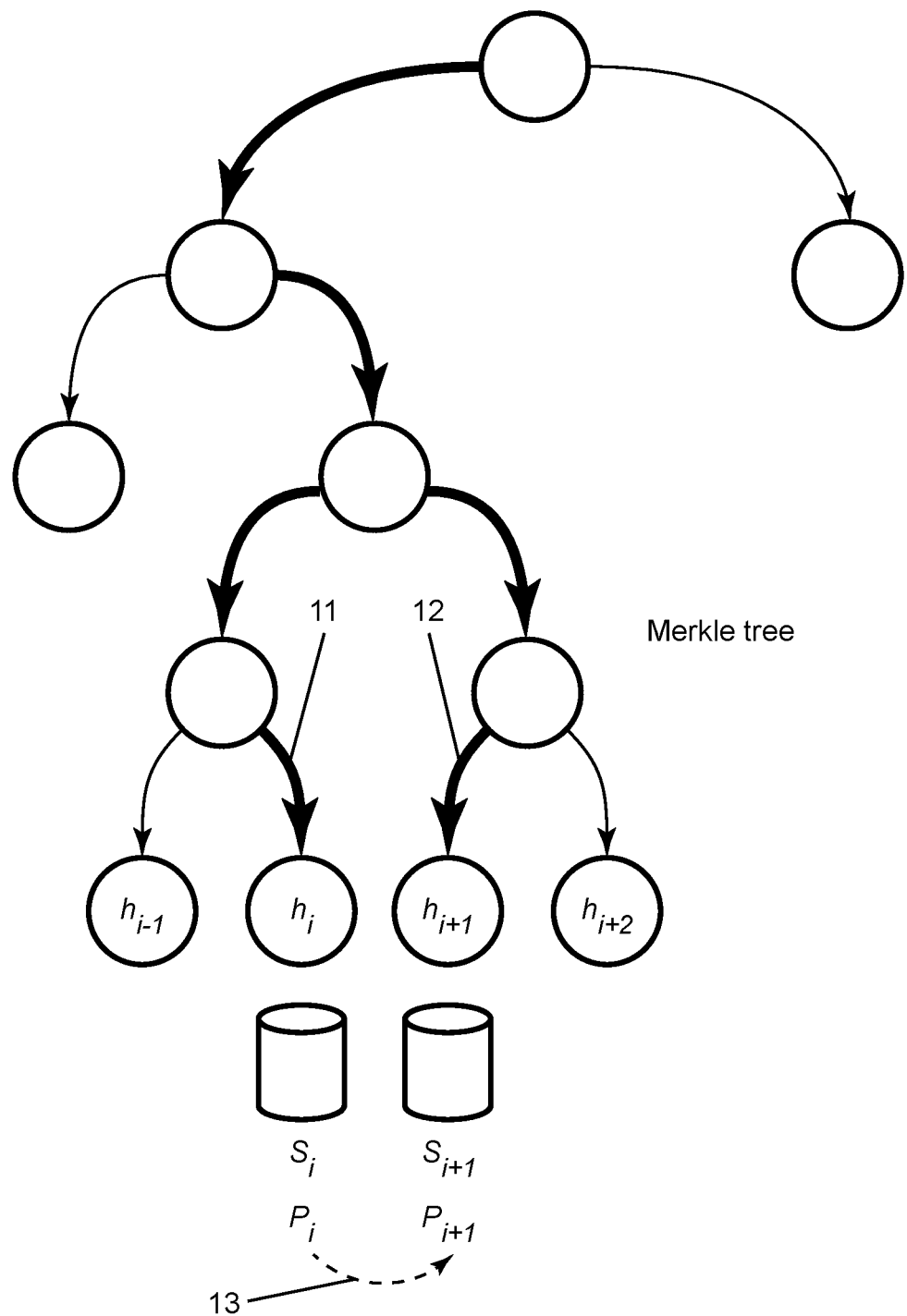
FIG. 1 shows a diagram of a Merkle tree including a plurality of nodes according to one embodiment of the present disclosure.

During a computation to be verified with probabilistic verification methods disclosed herein, a state of a computation is saved at certain predetermined points. A hash tree, such as a Merkle tree, is subsequently built using the hashes of those states saved at the predetermined points. Resulting node labels in the hash tree are deterministic, yet unpredictable. A value of the root label may serve as a source of entropy to choose a set of leaves of the hash tree in a deterministic fashion. By using the value of the root label, it is not known which leaves will be picked before all computational steps are completed. At the same time, any party can verify that the correct leaves are selected given only the root hash. Those leaves and their transitions to their respective successors form a probabilistic proof that a computation was performed accurately. FIG. 1 illustrates a Merkle tree with a set of selected computational steps. For example, with just 32 positions are selected in an arbitrarily long computation, it can be calculated with 99% probability if more than 12.5% of the computational steps are not what they should be given proper execution of the computation. Higher confidence may be achieved by selecting additional positions in the computation.

Figure 2:
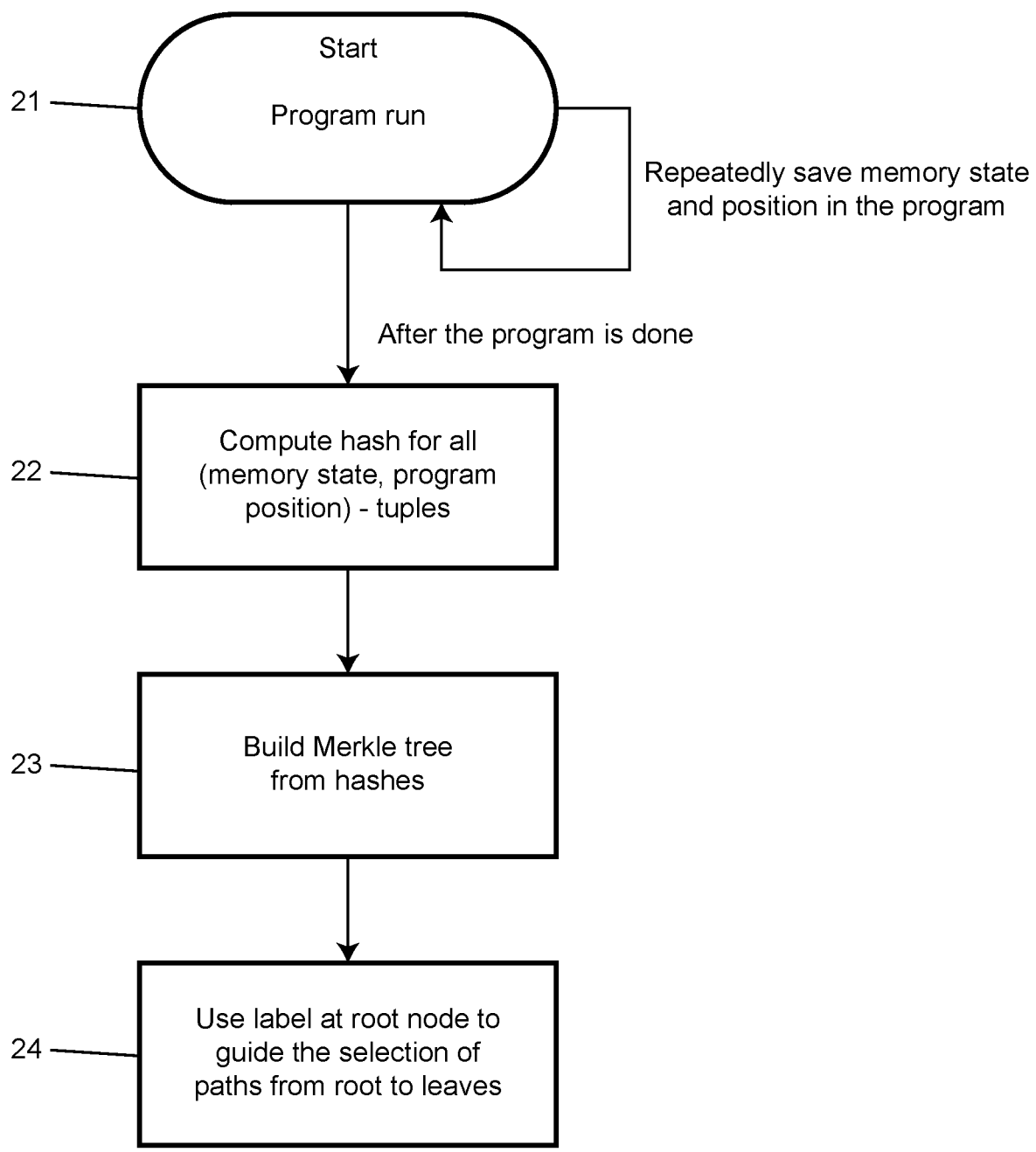
FIG. 2 shows a flow chart of derivation of a Merkle tree according to one embodiment of the present disclosure.
Figures 3, 4, 5:
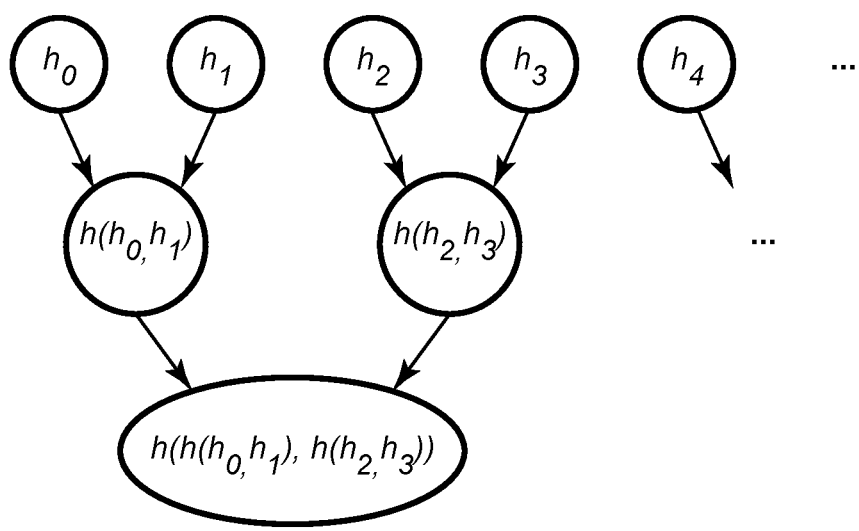
FIG. 3 shows a table of memory states at a plurality of positions in a program according to one embodiment of the present disclosure.
FIG. 4 shows a table of a plurality of hashes corresponding to states of a program at a plurality of positions of the program according to one embodiment of the present disclosure.
FIG. 5 shows a plurality of leaf nodes and a root node according to one embodiment of the present disclosure.

More specifically, it is assumed that a program of length T stores the state of computation at certain points as m1, m2, . . . , mT. Methods of the present disclosure include performing the steps shown in FIG. 2. In a first step, a hash $h(m_i)$ for all states $m_i$ is computed. Next, a binary Merkle tree is derived, wherein leaves of the tree are the hash $h(m_i)$ at states of the computation and a tree is built by setting a label of a parent as a hash of child labels h(node)=h(node·child$_{left}$+node·child$_{right}$). The hash at a root of the tree is deterministic yet unpredictable assuming that hash collisions cannot be computed. For a given number of times P (e.g. P=32), a leaf node is selected deterministically using the root hash of the tree. For each leaf node selected deterministically, a path is recorded from a root of the tree to the leaf by forming a path formed of a sequence of nodes from a root to a leaf such that each node in a sequence is a child of a preceding node. For each node that is not a leaf, a node label is stored as well as labels of all children of the node. For each path leading to a hash, a memory state at a position $m_i$ and a succeeding position $m_{i+1}$. In one embodiment, a new path to position $m_{i+1}$ is formed. In another embodiment, each leaf contains a pair of memory states ($m_i$, $m_{i+1}$). These paths P of hashes and their corresponding states 2P, plus information about the input to the computation are published as proof.

One or more other entities may verify the computation. All paths P start at the same root, i.e. the first element of each path is the same root hash. All paths that should be given according to the value of the root hash are indeed provided in the published proof. For each of the P paths to the hash of computational state mj, a path to the hash of state mj exists. For all paths the Merkle conditions hold, i.e. h(node)= h(node·child$_{left}$+node·child$_{right}$) along the way from the root to a leaf. The label of the leaf is the hash of the corresponding state. A program to verify the computation is executed starting at state $m_i$ until the next breakpoint results in state $m_j$.

It is not known at the beginning, or even during the computation, which paths will be published, as it depends on the tree as a whole, hence a malicious actor cannot cheat by executing only a small fraction of computational steps. If a malicious or faulty actor executes a fraction off incorrect steps, the probability of at least one of them being detected is $$1 - \frac{((1-f) \cdot N) choose P}{N choose P},$$

where N is the total number of computational steps. As N grows, this is approximately equal to $1-(1-f)^P$. With P=32 a detection probability of 50% limits f at 2.143%. Still with just P=32, any computation with 12.5% incorrect steps will be detected with 99% probability. Increasing P allows higher probabilities and more sensitive detection.

Figure 6:
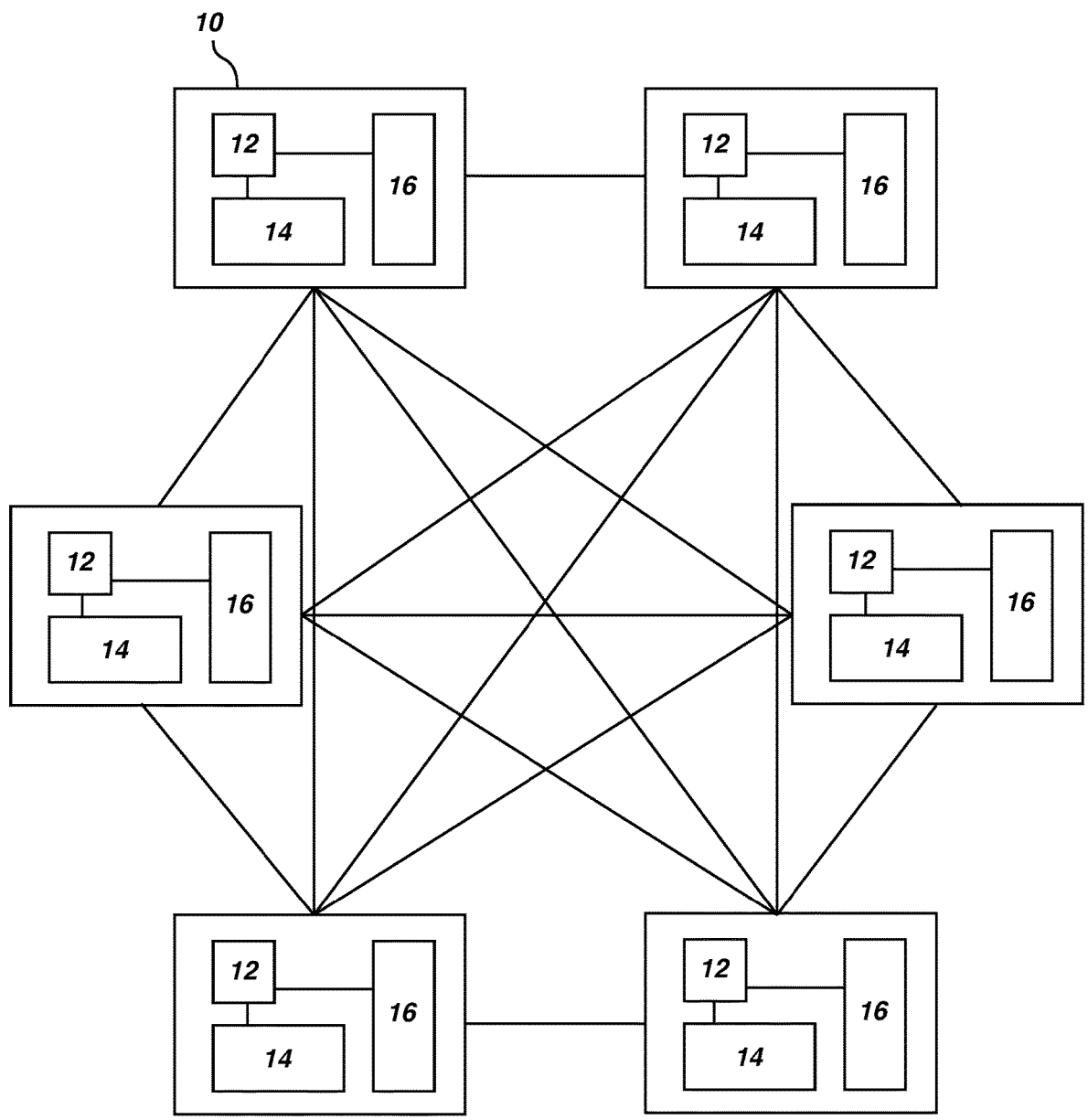
FIG. 6 shows a distributed network of devices for performing and verifying computations according to embodiments of the present disclosure.

Embodiments of the present disclosure can be employed to confirm the validity in a fixed number of steps. If an offending entry is found, a challenger identifies the path number k, which serves as evidence for unfaithful execution of the computation. Any external validator can now be easily convinced of the unfaithfulness of the computation by executing a single computational step. For example, as shown in FIG. 6 embodiments of the present disclosure enable verification of a computation performed by a node or device 10. A plurality of the devices 10 are in communication in a distributed network. Each of the devices 10 preferably includes a processor 12 in electronic communication with a memory 14 of the devices 10 and a communications component 16 such that the devices 10 may transmit and receive data from one another. A first of the devices 10 may perform a computation using the processor 12 of the devices 10 and store data including hashes and proofs as described above. Subsequently, a proof as disclosed above is published to other of the devices 10 for verification by one or more of the other devices 10.

For larger computations, i.e. folding a protein or training a neural network, it may not be feasible to store all states on a hard disk, as this quickly reaches several gigabytes. Therefore, a tradeoff may be used between local and network data. Instead of saving all states to disk only to compute a small proof and deleting most of it afterwards, several partial proofs can be submitted. Whenever the allocated disk capacity is full, a Merkle tree is created and the proof of computation up until that point is published. Afterwards, all but the last state can be deleted and the computation can be resumed. We keep the last computational state of the previous partial proof as the first state of the next proof. Obviously, we need a way to ensure that partial proofs are connected. Therefore the leftmost and rightmost branch (and their respective states) are also included in the proofs and verify that the rightmost branch of one partial proof corresponds to the leftmost branch in the next proof. A judge can verify a set of partial proofs in much the same way as it verifies a monolithic one, with the addition of checking that the last state of one partial proof is equal to the first state of the next partial proof.

In numerically sensitive computations, such as molecular dynamics, running the same code and inputs on different processors can produce different results, even if there was no malice. Unlike simple duplication of work or TrueBit-style verification, methods disclosed herein are robust to this phenomenon because it takes multiple steps of computation for discrepancies to compound and disclosed methods only verify individual steps. When a verifier or judge repeats a step of computation, it can check that its results match within an epsilon, where that epsilon was defined as part of the judging criteria a priori and agreed to by the worker and requester by virtue of their commitments.

Embodiments of the present disclosure are not limited to blockchain technology, and may further be used to verify performance in a variety of other suitable applications.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A method of performing a computation by an untrusted entity, the method comprising:
   storing a state of the computation by the untrusted entity at one or more points along a length of the computation;
   generating one or more hashes based on the state of the computation by the untrusted entity at the one or more points along the length of the computation;
   generating a hash tree including one or more leaf nodes, wherein the one or more leaf nodes of the hash tree correspond to the one or more hashes of states of the computation and further wherein the one or more leaf nodes of the hash tree are derived as the hash of at least two child nodes;
   creating at least one pair of paths from a root of the hash tree to the leaf nodes corresponding to the one or more of hashes of states of the computation, the pair of paths of the hash tree leading from the root of the hash tree to the leaf nodes corresponding to hashes of adjacent point of the computation; and
   transmitting a proof of the computation by the untrusted entity comprising the at least one pair of paths from a root of the hash tree and siblings of each leaf destination of the pair of paths to one or more other entities for verification.

2. The method of claim 1 wherein states of the computation are stored at 32 or more points along the length of the computation.

3. The method of claim 1, wherein at least one of the states of the computation is stored on memory of the untrusted entity.

4. The method of claim 3, wherein when the memory of the untrusted entity is full, a partial proof of the computation is published.

5. The method of claim 1, further comprising verifying the performed computation by performing the steps of:
   receiving the transmitted proof of the computation including the at least one pair of paths of the hash tree and siblings of each leaf destination of the pair of paths; and
   verifying that a hash of each leaf destination is a hash of a pair of children of the leaf.

6. A method of verifying a computation by an untrusted entity, the method comprising:
   on an untrusted device:
      storing states of the computation at one or more points along a length of the computation;
      generating one or more hashes based on the states of the computation at the one or more points along the length of the computation;
      generating a hash tree including one or more leaf nodes, wherein the one or more leaf nodes of the hash tree correspond to the one or more hashes of the states of the computation and further wherein the one or more leaf of the hash tree nodes are derived as the hash of at least two child nodes;
      creating at least one pair of paths from a root of the hash tree to the leaf nodes corresponding to the one or more of hashes of the states of the computation, the pair of adjoining paths of the hash tree leading from the root of the hash tree to the leaf nodes corresponding to hashes of adjacent point of the computation; and
      transmitting a proof of the computation comprising the at least one pair of paths from a root of the hash tree and siblings of each leaf destination of the pair of paths to one or more other entities for verification;
   on a third party device:
      receiving the transmitted proof of the computation including the at least one pair of paths of the hash tree and siblings of each leaf destination of the pair of paths; and
      verifying that a hash of each leaf destination is a hash of a pair of children of the leaf.

7. A method of verifying a computation by an untrusted entity, the method comprising:
   on an untrusted device:
      storing states of the computation at one or more points along a length of the computation;
      generating one or more hashes based on the states of the computation at the one or more points along the length of the computation;
      generating a hash tree including one or more leaf nodes, wherein the one or more leaf nodes of the hash tree correspond to the one or more hashes of the states of the computation and further wherein the one or more leaf of the hash tree nodes are derived as the hash of at least two child nodes;
      creating at least one pair of paths from a root of the hash tree to the leaf nodes corresponding to the one or more of hashes of the states of the computation, the pair of adjoining paths of the hash tree leading from the root of the hash tree to the leaf nodes corresponding to hashes of adjacent point of the computation; and transmitting a proof of the computation comprising the at least one pair of paths from a root of the hash tree and siblings of each leaf destination of the pair of paths to one or more other entities for verification;

on a third party device:

receiving the transmitted proof of the computation including the at least one pair of paths of the hash tree and siblings of each leaf destination of the pair of paths; and verifying that a hash of each leaf destination is a hash of a pair of children of the leaf wherein when the memory of the untrusted entity is full, a partial proof of the computation is published.

8. The method of claim 7, wherein the partial proof is published for verification by a third party.

9. The method of claim 7, wherein when the partial proof is transmitted, all but one state of the computation are deleted from the memory of the untrusted entity.

* * * * *